United States Patent [19]

Kampman et al.

[11] 4,103,475
[45] Aug. 1, 1978

[54] APPARATUS FOR FORMING A BALE OF HAY

[75] Inventors: Lester R. Kampman; James K. Ulrich; James H. Hodgson, all of Vinton, Iowa

[73] Assignee: Chromalloy American Corporation, New York, N.Y.

[21] Appl. No.: 719,064

[22] Filed: Aug. 30, 1976

[51] Int. Cl.² .......................................... A01D 75/00
[52] U.S. Cl. ...................................... 56/16.4; 56/341
[58] Field of Search .................... 56/344, 343, 16.4, 1

[56] References Cited

U.S. PATENT DOCUMENTS

| | | | |
|---|---|---|---|
| 3,680,296 | 8/1972 | Beebout | 56/16.4 |
| 3,740,935 | 6/1973 | Gay | 56/16.4 |
| 3,797,215 | 3/1974 | Kopaska | 56/341 |
| 4,019,309 | 4/1977 | Lundell | 56/341 |

Primary Examiner—Russell R. Kinsey

Attorney, Agent, or Firm—Wegner, Stellman, McCord, Wiles & Wood

[57] ABSTRACT

Apparatus for forming a bale of hay has a wheeled frame that spans a windrow of hay and is moved forwardly therealong, a baling chamber on the frame which receives the windrow as the apparatus is moved along, and means in the chamber for forming the windrow into a spiral bale as the apparatus is moved. A pair of disks are rotatably mounted in the sides of the baling chamber near the rear of the chamber, and the diameter of the disks is a major fraction of the diameter of a finished bale. Endless means which is part of the bale forming means has a lower bale rolling run the sides of which are supported on the disks. The rearward part of the endless means is nearly vertical, and no other part of the endless means contacts the forming bale until after the diameter of the bale is equal to that of the disks, so the bale has a relatively loose core and a firmly packed exterior, and the sides of the bale are relatively smooth and even from being confined between the disks.

10 Claims, 9 Drawing Figures

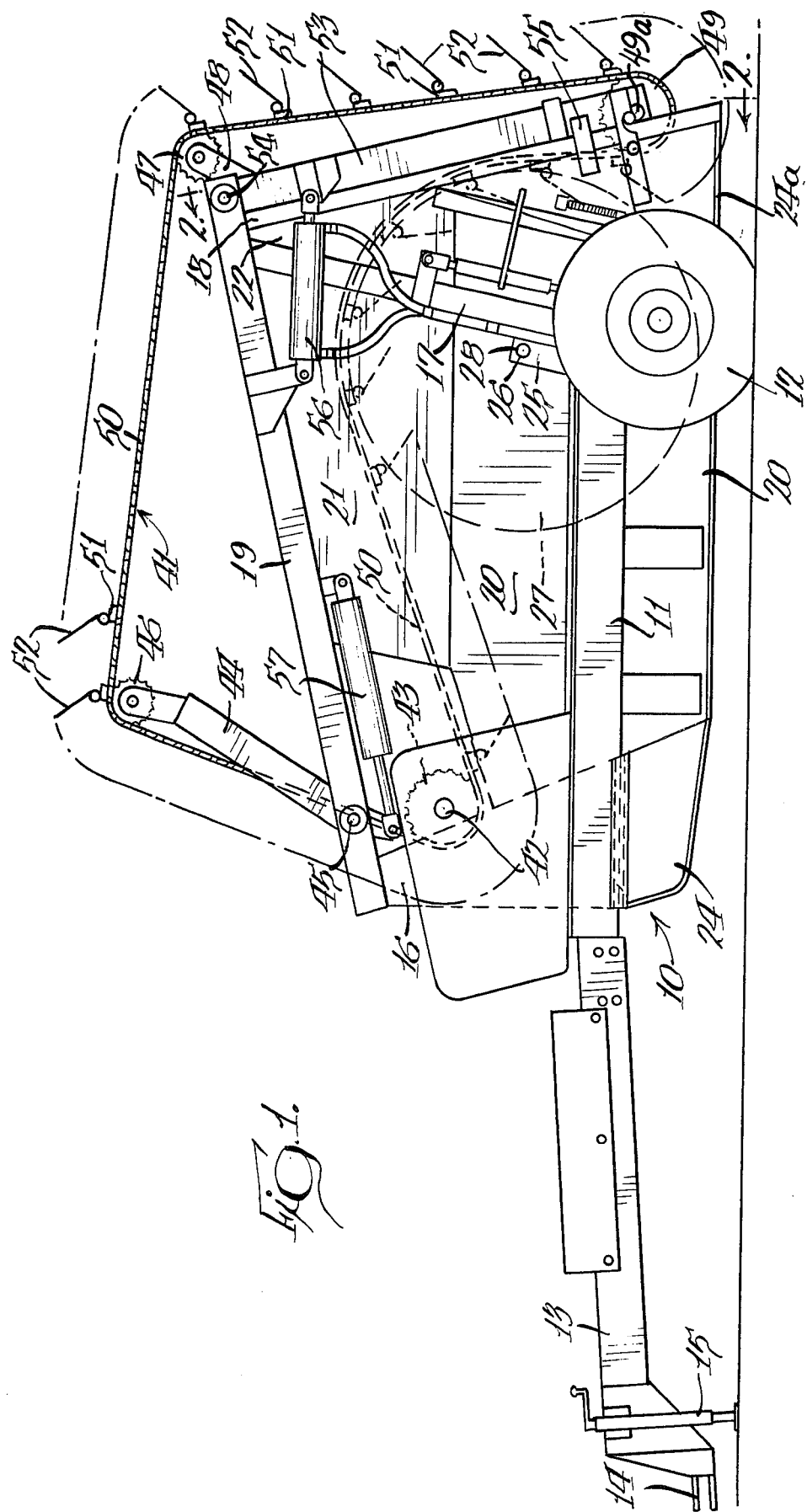

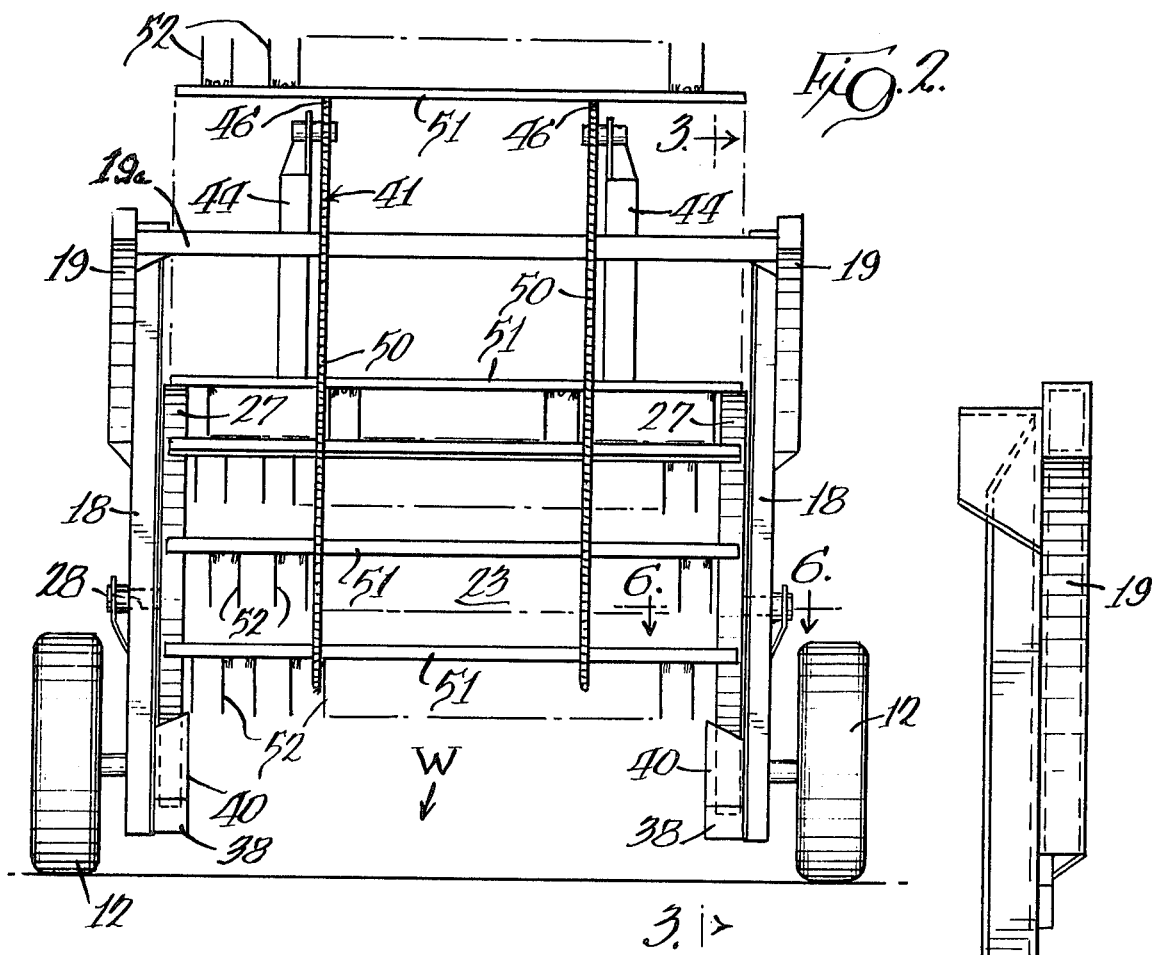
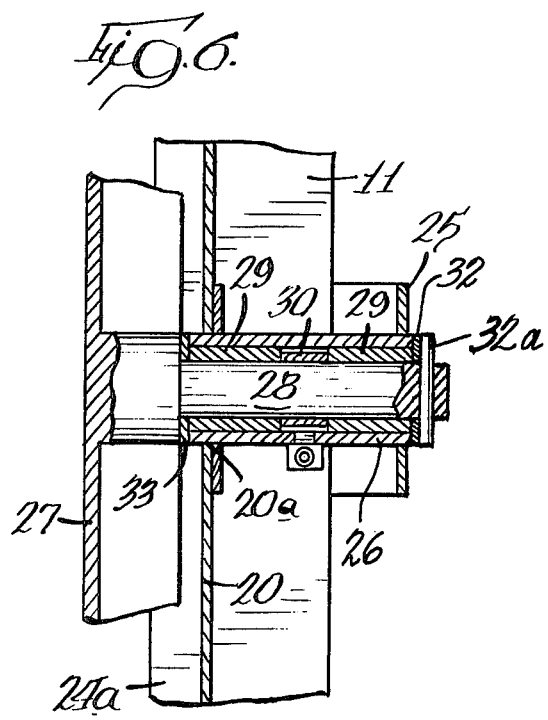
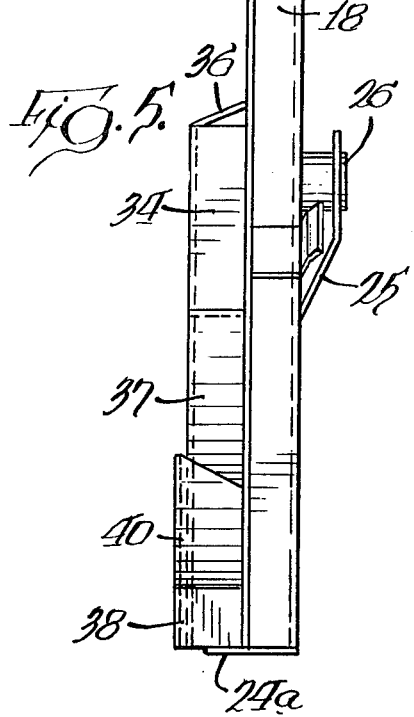

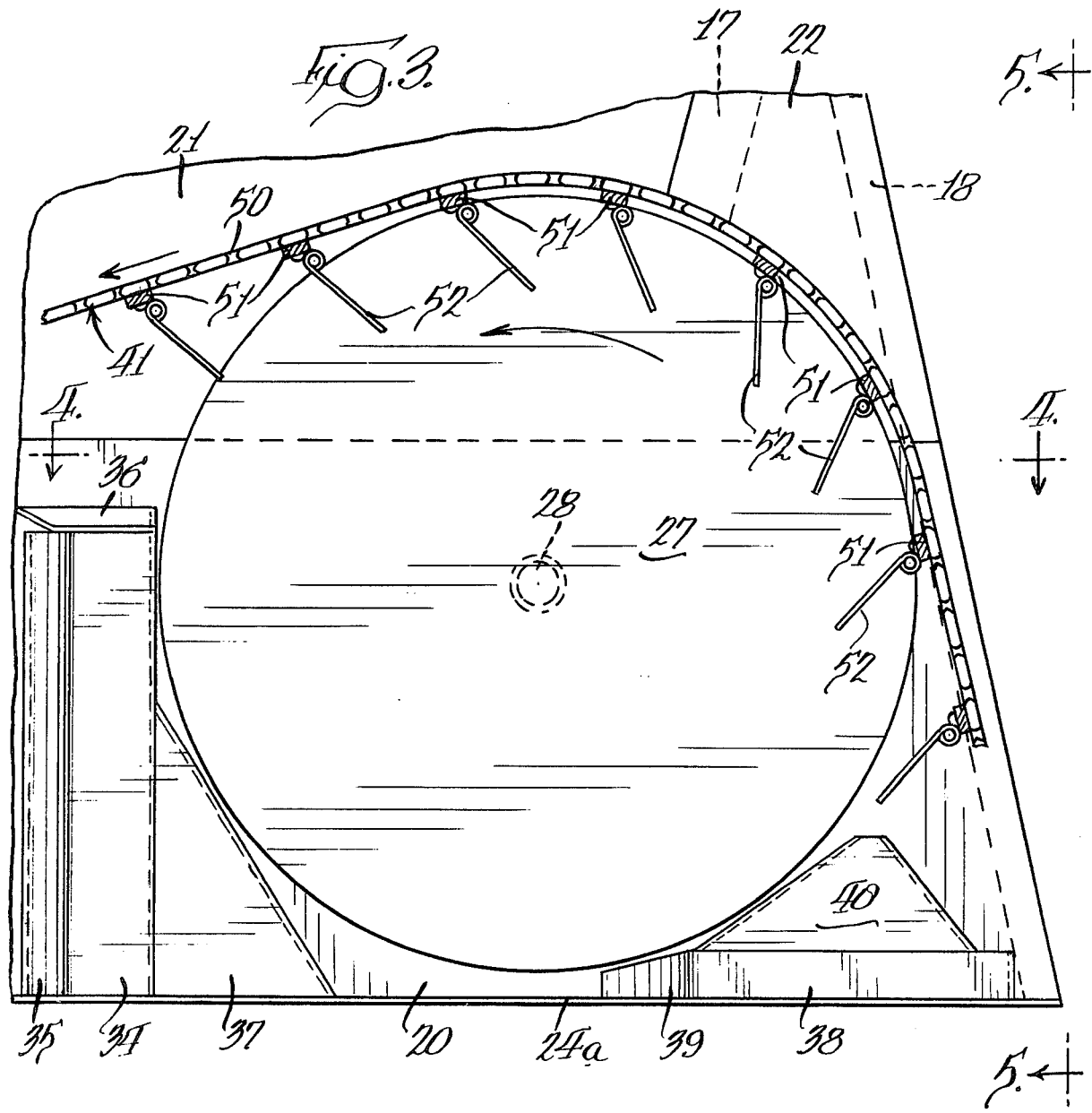
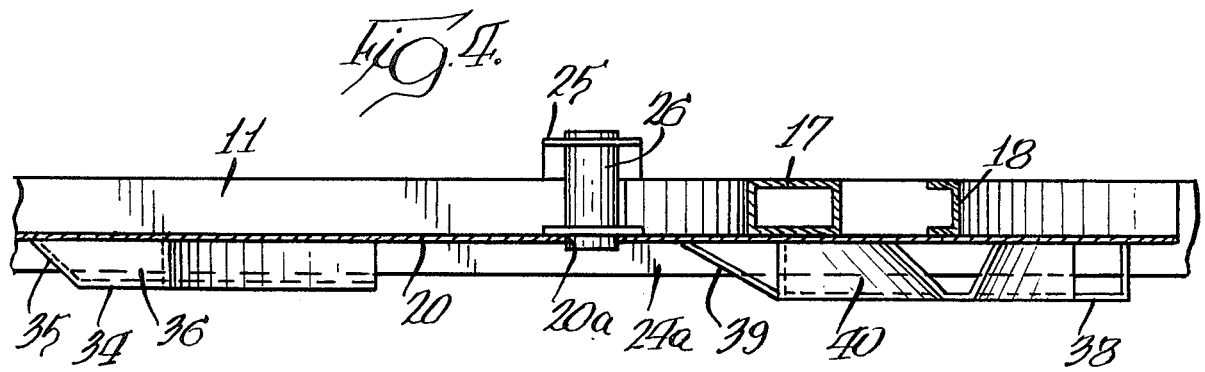

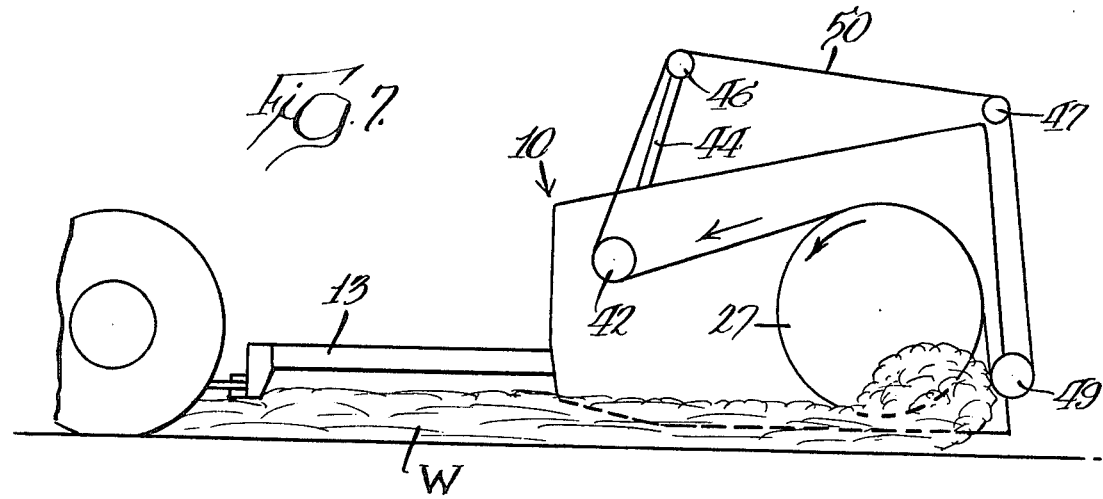
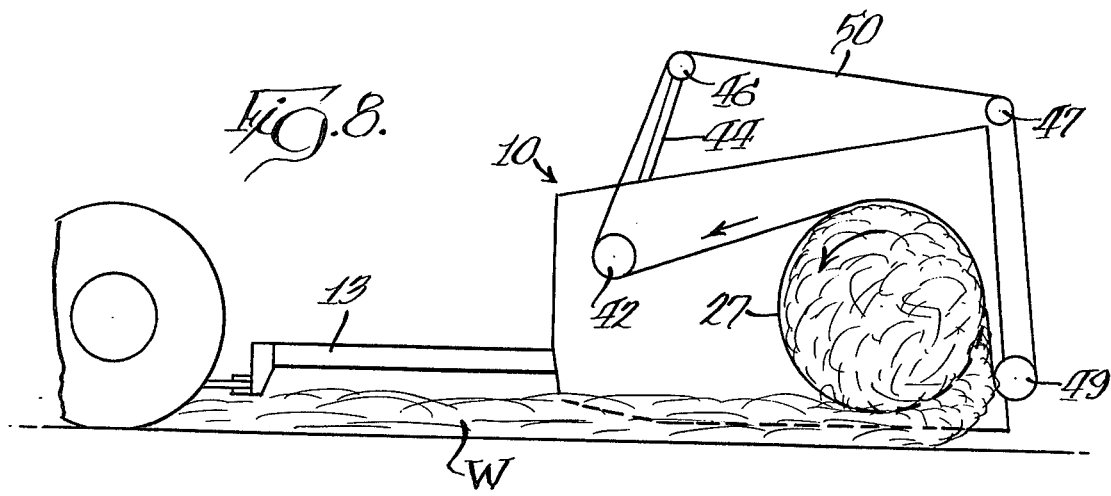
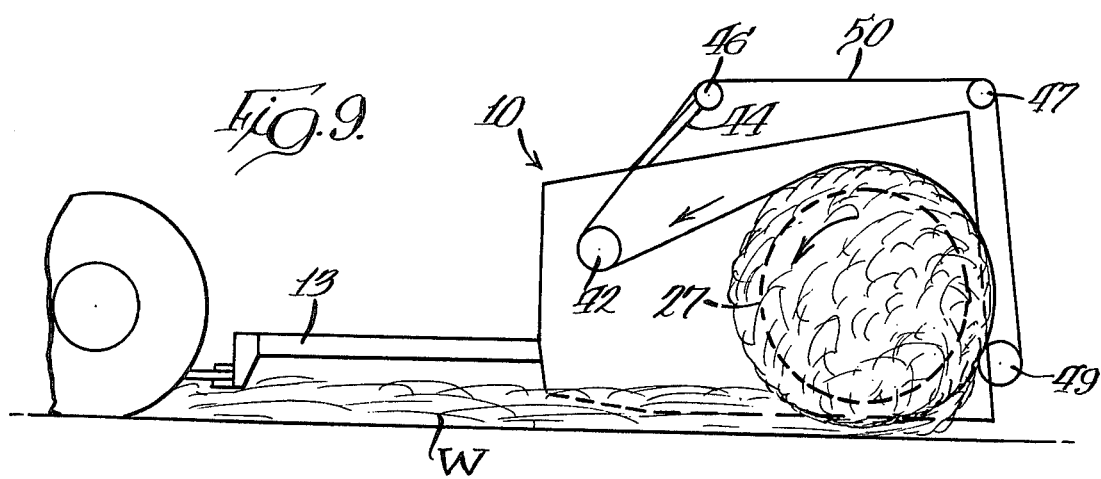

APPARATUS FOR FORMING A BALE OF HAY

BACKGROUND OF THE INVENTION

Various types of apparatus for rolling a spiral bale fom a windrow or swath of hay or straw have been devised over the years, beginning with Luebben et al U.S. Pat. No. 799,175, issued in 1905; which was followed by other Luebben patents; and later Harrer U.S. Pat. Nos. 2,424,821 was issued to Allis-Chalmers; and a Kolzing 2,581,542 was issued to International Harvester Company. Subsequently, Harrer U.S. Pat. Nos. 2,656,786 and 3,004,377 issued to Allis-Chalmers on improvements in the rotary baling mechanisms.

All of the above identified patents made relatively small bales in a baling chamber into which hay was fed by an inclined conveyor. More recently, there have been a number of developments directed toward rotary balers which roll spiral bales that may be from 5 feet to 10 feet in diameter. The first such balers in the United States have been based broadly upon the type of mechanism disclosed in Avery U.S. Pat. No. 3,110,145, which rolls a windrow into a spiral bale in contact with the ground, much like rolling up a carpet. Reference in this regard is also made to U.S. Pat. Nos. 3,751,890, and 3,797,215. In addition to the several types of balers which roll a bale in contact with the ground, a number of large bale rollers have recently been developed which roll a large bale in a chamber above the ground. Reference is here made, for example, to U.S. Pat. No. 3,722,197.

A problem which is generally common to the existing rotary balers is a tendency to roll a bale so dense that air is unable to penetrate the center of the bale for drying the hay and preventing spoilage. It has heretofore been thought that the most desirable bale is one which is very dense throughout; but we have now learned that a bale of uniform high density is less desirable than one which is somewhat loose in the middle and has a small amount of relatively high density material around the outside.

SUMMARY OF THE INVENTION

The present invention is disclosed as applied to a ground engaging hay bale rolling apparatus of the general type of U.S. Pat. No. 3,751,890. However, it is not limited to a ground engaging baler, and in fact is quite applicable to some of the present commercial chamber type balers.

In accordance with the invention, a pair of large disks are rotatably mounted at the two sides of the baling chamber, and the endless bale rolling means has its two sides carried upon the disks, which are quite close to the rear of the baling chamber so that the rear portion of the bale rolling endless means occupies a substantially vertical orientation. The balance of a bale rolling run of the endless means wraps partially around the disks and is trained around a forward rotary member that is rotatable about an axis fairly close to the horizontal plane of the axis of rotation of the disks.

The diameter of the disks is a major fraction of the diameter of the finished bale, and preferably is fairly close to the diameter of a finished bale. The result is that as the baling apparatus moves forwardly over a windrow the hay is first contacted by the substantially vertical part of the lower run of the endless bale rolling means which serves to lift the hay in the windrow so that the forward motion of the apparatus may start rolling it into a relatively loose bale. At the same time, the disks closely confine the two sides of the bale as it is building, so as to form a bale which has relatively straight and smooth sides.

The bale is relatively loosely packed until its diameter becomes equal to that of the disks, whereupon the pressure of the endless bale rolling means upon the forming bale causes the outermost lays of the bale to be relatively dense, as the enlarging bale forces the bale engaging run of the endless means off of the periphery of the disks.

The result is a bale which is relatively soft or loose in the middle, and quite dense around the outside; thus providing a bale which stores far better than do the uniformly high density bales of the prior art.

THE DRAWINGS

FIG. 1 is a side elevational view of a baling apparatus embodying the invention;

FIG. 2 is a fragmentary, vertical sectional view taken substantially as indicated along the line 2—2 of FIG. 1;

FIG. 3 is a fragmentary sectional view on an enlarged scale taken substantially as indicated along the line 3—3 of FIG. 2;

FIG. 4 is a fragmentary, horizontal, longitudinal sectional view taken substantially as indicated along the line 4—4 of FIG. 3 to show the right side frame structure with the disk omitted;

FIG. 5 is a fragmentary rear elevational view taken substantially as indicated along the line 5—5 of FIG. 3, showing the right side frame structure with the disk omitted;

FIG. 6 is an enlarged, fragmentary sectional view taken substantially as indicated along the line 6—6 of FIG. 2; and FIGS. 7, 8 and 9 are diagrammatic views of the apparatus at three different stages of a bale forming operation; FIG. 9 showing the approximate relationship between the disk and a finished bale.

DETAILED DESCRIPTION OF THE INVENTION

Referring to the drawings in detail, and referring first to FIGS. 1 and 2, a frame, indicated generally at 10, has main side beams 11 toward the rear of which are wheels 12 which are adapted to span a windrow W of hay; and a draft tongue 13 at the front of the frame has a laterally bifurcated connector 14 for attaching the apparatus to a draw bar of a farm tractor by means of a pintle (not shown). The draft tongue 13 is illustrated as supported upon a manual screw jack 15 as is common for tractor drawn agricultural implements when they are not conneced to a tractor draw bar.

Welded to the frame side beams 11 are side structures which include upright forward beams 16, rearwardly inclined rear structural members 17, forwardly inclined rearmost structural members 18, and longitudinal upper beams 19 which are connected to the members 16, 17 and 18. Also carried upon the main beams 11 are main lower side plates 20, upper side plates 21, and upper rear filler plates 22 which fill the space between the structural members 17 and 18 and above the lower main side plates 20 to the rear of the upper side plates 21. The side plates 20, 21 and 22 cooperate to define a baling chamber 23 (FIG. 2). The frame 10 also includes a transverse front end member (not shown) which is connected between the forward ends of the main side beams 11 and receives the rear of the draft tongue 13, and an upper rear cross member 19a (FIG. 2) which is between the rear extremities of the upper frame beams 19 to the rear of the rearmost upright members 18. Runners 24 are mounted beneath the forward ends of the side beams 11, forward of the main lower side plates 20.

Surmounting the main beams 11 immediately forward of the rearwardly inclined rear frame member 17 are brackets 25 which carry hollow, tubular bearing supports 26 that project through holes 20a in the plates 20; and disks 27 are provided with external spindles 28 which impale the hollow tubular bearing supports 26 and are mounted therein in suitable bearings 29 and spacer bearings 30. External washers 32 and retaining pins 32a secure the spindles 28 within the tubular bearing supports 26, and internal spacers 33 between the disk hubs and the inner ends of the bearing supports 26 retain the disks 27 in close, spaced relationship to the side plates 20, 21 and 22.

Referring now particularly to FIGS. 4 and 5, it is seen that each of the runners 24 includes a flange 24a that extends from front to rear of the lower margin of the lower side plate 20 and extends inwardly into the baling chamber 23 where, as seen in FIG. 3, it is only a short distance below the lower extremity of the disk 27. The runner flange 24a provides support for a group of filler members and shield members which are seen in FIG. 3 to closely embrace the lower portion of the disk 27 so as to prevent hay from entering the space between the disk and the side plate 20. Toward the front of the baling chamber 23 is a box-like front filler 34 which extends above the horizontal plane of the spindle 28 and has a diagonal front wall 35 and an inclined top plate 36. Between the front filler 34 and the lower portion of the disk 27 is a back filler 37. To the rear of a vertical plane through the spindle 28 is a bottom shield 38 which has a diagonal front plate 39; and surmounting the bottom shield is an upper shield 40.

Means for forming a bale of hay is indicated in the drawings generally at 41, and includes a front lower cross shaft 42 which carries a pair of sprockets 43, a pair of arms 44 which are pivoted at 45 in the upper beams 19 and carry a pair of front upper sprockets 46, rear upper sprockets 47 which are journalled on brackets 48, rear lower sprockets 49, and a pair of endless bale forming chains 50 which are trained around all of said sprockets and carry raddles 51 upon each of which is mounted several laterally spaced sets of spring hay engaging tines 52. The brackets 48 and spindles 49a for the sprockets 49 are mounted upon a rear gate 53 which is pivotally mounted at 54 between the rear extremities of the upper longitudinal frame members 19, and the lower portion of which is held between spring latches 55 which are mounted upon the rear side frames 18. The rear gate 53 is swung by a pair of hydraulic rams 56 between the position illustrated in FIG. 1 and a rearwardly extending, elevated bale releasing position in which it extends substantially horizontally from the pivotal mounting 54. The arms 44 which carry the forward upper sprockets 46 are connected to compression spring assemblies 57 which control the swinging of the arms 44 about their pivots 45 and which are adjustable to vary the force required to swing the arms.

As seen in FIGS. 2 and 3, the ends of the raddles 51 are supported upon the periphery of the disks 27, so that as the endless chains 50 are driven by power applied to the front lower sprocket shaft 42 the path of the chains and raddles is as illustrated in FIG. 3, with the chains at the rear of the baling chamber being nearly vertical, then curving around the upper parts of the disks 27, and extending diagonally downwardly and forwardly from the vertical diameter of the disks 27 to the front lower sprockets 43.

In operation, the apparatus is moved along the windrow W of hay with the chains 50 being driven in the direction of the arrow at the top left of FIG. 3, and with the disks 27 rotating as indicated by the arcuate arrow in FIG. 3. As the upwardly moving run of the chains 50 and raddles 51 contacts the windrow as shown in FIG. 7, the tines 52 lift the hay and the forward motion of the apparatus rolls it like a loose roll of carpet, so that the interior portion of the forming bale is relatively loose and soft, thus affording good air circulation through the bale. As the bale increases in diameter, as shown in FIG. 8, its increasing weight compresses the windrow as the bale moves forwardly over it, so that outer portions of the bale are somewhat denser than the core; but it is not until the bale reaches the size illustrated in FIG. 9, where it is bigger than the diameter of the disks 27, that heavy compressive force is placed upon the forming bale by the chains 50 and raddles 51, with the degree of pressure being determined by the setting of the adjustable springs 57. Thus, the outer portion of the bale is quite dense, so as to provide the bale with a dense, weatherproof outer surface.

In addition to providing for the formation of a bale which has a loose inner portion and a dense outer portion, the disks 27 confine the sides of the bale, producing smoother and more solid bale sides or ends than are formed in prior art balers, and in addition, the disks 27 prevent a bale from being displaced sideways when it is necessary to take the apparatus around a corner with a bale in the baling chamber. Previously with this type of baler it was necessary to feather the bale forming chains when turning a corner with a bale in the chamber.

The foregoing detailed description is given for clearness of understanding only and no unnecessary limitations should be understood therefrom as modifications will be obvious to those skilled in the art.

We claim:

1. Rotary baling apparatus comprising, in combination:

a wheeled frame which is adapted to span a windrow of hay and be moved forwardly therealong;

means defining a baling chamber on said frame which receives the windrow as the apparatus is moved therealong;

a pair of rotatable disks at the sides of the baling chamber which confine the sides of a forming bale, the diameter of said disks being a major fraction of the diameter of a finished bale;

means in said chamber for forming the windrow into a spiral bale as the apparatus is moved forwardly, said means including endless means which has a lower bale rolling run that may contact hay in the chamber and roll it forwardly, said endless means in said lower run having its sides supported on said disks, and means which permits at least a part of said lower run to move upwardly as a bale enlarges;

means for driving said endless means so the lower run moves forwardly;

and means for elevating the rearward portion of the chamber defining means to release a finished bale from the chamber, whereby a bale formed in said apparatus has a relatively loose core and a firmly packed exterior, and the sides of the bale are relatively smooth and even.

2. The combination of claim 1 which includes means separate from the disks for driving the endless means.

3. The combination of claim 1 in which the bottom of the chamber is open to the ground.

4. The combination of claim 1 in which the endless means includes a front lower roller which is on an axis forward of the disks and close to the horizontal plane of the axis of rotation of said disks.

5. The combination of claim 1 in which the diameter of the rotatable disks is only slightly less than the diameter of a finished bale.

6. The combination of claim 1 in which the endless means comprises parallel endless bands and a plurality of transverse hay engaging raddles secured to said bands, the end portions of said raddles being supported on the disks.

7. The combination of claim 1 in which the rearward extremities of the disks are close to the rear of the baling chamber, so the rearward part of the lower run of the endless means is substantially vertical.

8. The combination of claim 7 in which the endless means includes a front lower roller which is on an axis forward of the disks and close to the horizontal plane of the axis of rotation of said disks.

9. The combination of claim 8 in which the diameter of the rotatable disks is only slightly less than the diameter of a finished bale.

10. The combination of claim 9 which includes means separate from the disks for driving the endless means.

* * * * *